Figure 9:
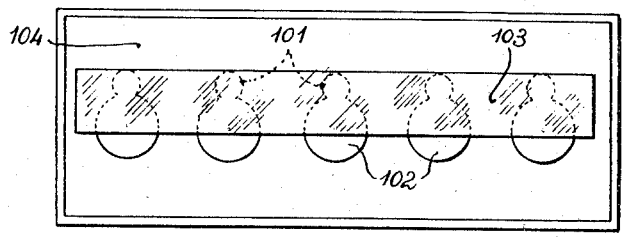

Feb. 6, 1968   J. BUISSIERE ET AL   3,367,841
DEVICE AND PROCESS FOR THE STUDY OF THE ENZYMATIC
CHARACTERISTICS OF LIVING CELLS
Filed Jan. 22, 1964   2 Sheets-Sheet 1
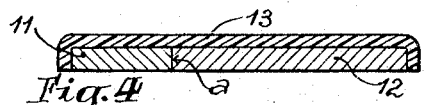
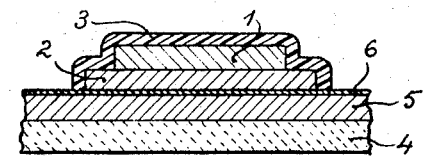
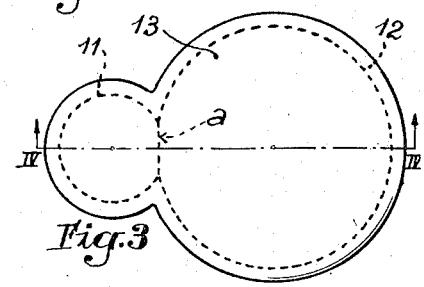
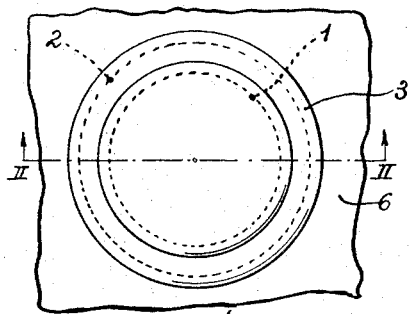
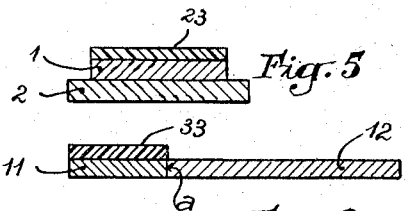
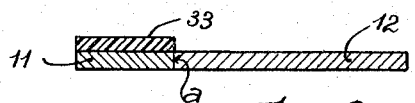
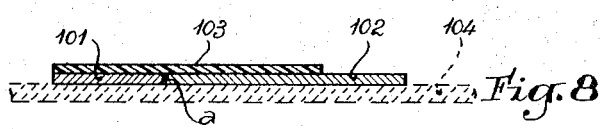
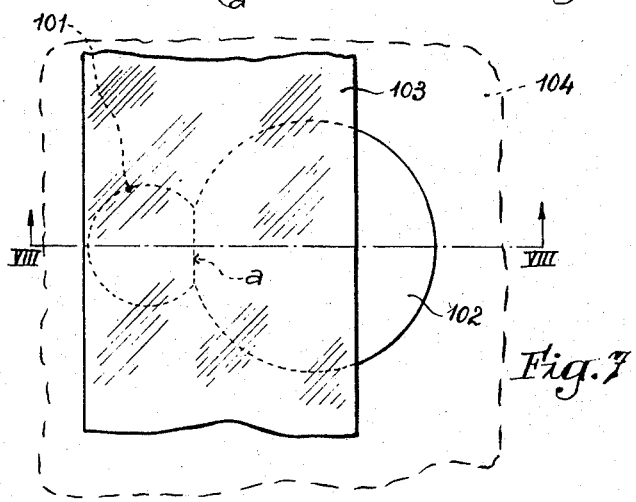
JEAN BUISSIERE INVENTOR
PIERRE LACROIX
BY Gordon W. Hueschen
ATTORNEY

JEAN BUISSIERE INVENTOR
PIERRE LACROIX

United States Patent Office 3,367,841
Patented Feb. 6, 1968

3,367,841
DEVICE AND PROCESS FOR THE STUDY OF THE ENZYMATIC CHARACTERISTICS OF LIVING CELLS
Jean Buissiere, Villeurbanne, and Pierre Lacroix, Lyon, France, assignors to Promoveo, Collonges-au-Mont-d'Or, France, a French limited-liability company
Filed Jan. 22, 1964, Ser. No. 339,492
Claims priority, application France, Feb. 6, 1963, 923,887; Oct. 7, 1963, 44,069
17 Claims. (Cl. 195—103.5)

The present invention relates to improvements in devices used for the study of the fermentative characteristics of living cells, such as bacteria, protoza, algae, micro-fungi, cell cultures and the like.

In order to check in the laboratory the metabolic use or non use of chemical substances by living cells, it has been proposed to use devices in the form of discs of absorbent material, impregnated with the substance to be tested and then dried.

In use, these devices are disposed on a hydrating and nutritive medium to which an appropriate indicating reagent has been added, the living cells to be studied being spread onto the surface of the said medium. The latter is generally formed by a nutritive agar-agar gel and it simultaneously ensures the multiplication of the cells, the moistening of the device which contains the chemical substance to be tested, and the diffusion into the said medium of this substance and of its degradation products.

It may be understood that under such conditions the results of the test are considerably delayed and that their detection is difficult.

The present invention has for its object to provide a quite simple device whereby the metabolic use or non-use of a substance by living cells may be easily and rapidly detected.

Another object of this invention is to provide means whereby a large number of tests may be effected at the same time in order to know the enzymatic composition of the living cells.

A further object of this invention is to provide a device for the identification of bacteria or like micro-organisms, which will be quite inexpensive and which may be produced in large quantities at a low cost.

The device according to the invention comprises two discs of absorbent material, in intimate contact with each other and impregnated with the chemical substance or substrate to be tested and with an appropriate indicating reagent, the first one of these discs being covered with a layer of an air- and water-tight material in order to achieve anaerobic fermentation conditions, while the second one is intended to be placed in contact with the resting living cells to be studied so as to form a support for the diffusion of the indicating reagent contained in the first disc, after reaction of this reagent with the degradation products of the aforesaid chemical substance.

It must be noted that the term "disc" has to be understood as designating any surface cut from a sheet and having in plan view any shape, without being limited to the sole circular shape.

According to a first embodiment of this invention, the chemical substance to be tested is contained in the dried state in the second disc. After impregnation and drying, the discs are assembled in superposition or in juxtaposition by means of an appropriate adhesive which has to be permeable in order to allow the diffusion of the indicating reagent, and they are covered by an air and water tight transparent strip. For use, the device is disposed on an appropriate hydrated support and a thick suspension in water of the resting cells to be studied is laid on the second disc so as to also diffuse into the first one.

According to another embodiment of the present invention, the chemical substance to be tested is contained in the first disc together with the indicating reagent. It will be understood that in the case in which the second disc is made of an absorbent material adapted to absorb a sufficient quantity of liquid, it may directly fulfill the role of the hydrating medium, the suspension of resting cells to be studied being disposed on the free side of this second disc in order to impregnate the latter. Here again the discs may be assembled in superposition or in juxtaposition, the layer of impervious material covering entirely the first disc and partially the second one so as to reduce evaporation of the hydrating liquid, while leaving uncovered a portion of the side of the said disc for its impregnation and for the direct application of the living cells. In a modification both discs are obtained by cutting a single piece in a sheet of absorbent material, appropriately covered by a layer of impervious material, the portion of this piece which corresponds to the first disc being impregnated with the chemical substance to be tested and with the indicating reagent.

Figure 10:
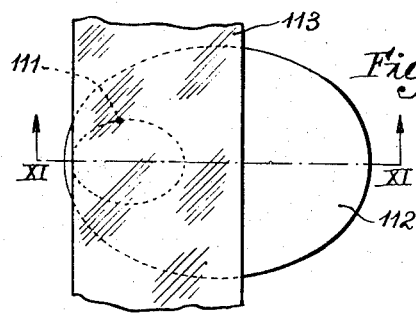
Figure 11:
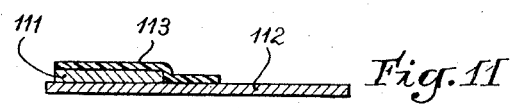
Figure 14:
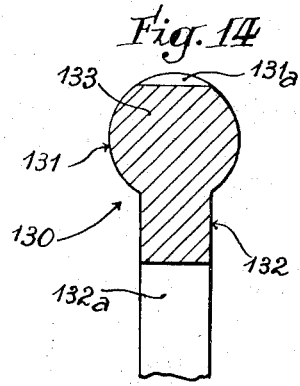
Figure 12:
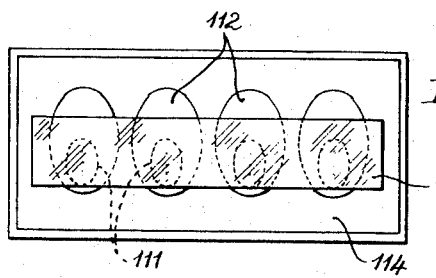
Figure 13:
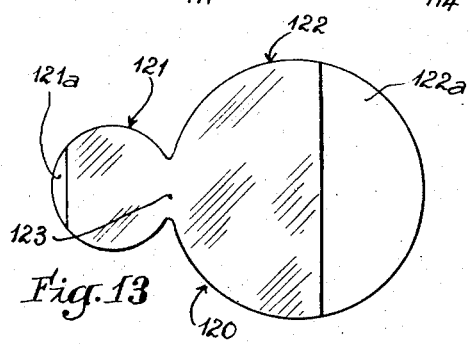
Figure 15:
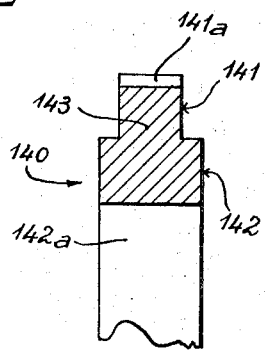

In the annexed drawings:
FIG. 1 is a plan view of a device according to a first embodiment of the invention.
FIG. 2 is a section thereof taken along line II—II of FIG. 1.
FIG. 3 is a plan view of a modification.
FIG. 4 is a section taken along line IV—IV of FIG. 3.
FIGS. 5 and 6 show in section a modification of FIG. 2, respectively FIG. 4.
FIG. 7 is a plan view of a device according to another embodiment of the invention.
FIG. 8 is a section taken along line VIII—VIII of FIG. 7.
FIG. 9 shows in plan view the disposition of several devices according to FIG. 7 on the bottom of a container.
FIG. 10 is a plan view of a modification of FIG. 7.
FIG. 11 is a section taken along line XI—XI (FIG. 10).
FIG. 12 is a plan view similar to FIG. 9, but corresponding to the device according to FIG. 10.
FIG. 13 is a plan view of another modification of FIG. 7.
FIGS. 14 and 15 show in plan view two modifications of FIG. 13.

The device shown in FIGS. 1 and 2 is obtained by the assembly of two discs 1 and 2 of absorbent material (blotting paper, paper for electrophoretic separations, ion exchanger paper, glass fibre texture or like absorbent material). Each disc is of substantially circular shape, it being noted that the diameter of disc 1 is slightly smaller than that of disc 2. The two discs are assembled in superposition by means of an appropriate permeable adhesive, and the whole is covered with a layer 3 of an air and water-tight material (paraffin or like substance), this layer leaving uncovered the free side of disc 2.

Before the assembling step, the disc 1 has been impregnated with a coloured indicating reagent (pH indicator for instance), while the disc 2 has been impregnated with the chemical substance to be tested, used at a high concentration; both discs have then been dried, the device thus obtained being able to be kept ready for use as long as desired.

At the time of use, the device 1-2-3 is disposed in a container on the transparent bottom 4 (FIG. 2) of which is placed a non-nutritive hydrating medium (agar-agar gel or the like). Before so disposing the device, the operator spreads on the surface of the medium 5 a layer 6 of the resting cell suspension to be studied. The container is then closed and introduced into an incubator with the bottom 4 turned upwards.

It will be understood that the by-products, resulting from the degradation of the chemical substance contained in the disc 2 by its contact with the layer 6, diffuse into the said disc 2 at the same time as the indicating reagent contained in the disc 1. It is further to be noted that the anaerobic conditions resulting from the presence of the layer 3 enhance the rapid procurement of clear and distinct results which may be readily detected on the free side of the disc 2, through the transparent bottom 4 of the container.

The three following examples are illustrative of the procedure.

*Example 1*

This example refers to the use of glucose by yeasts (the procedure and the results are the same if in lieu of yeasts there are used culture cells such as the KB or Hela strains).

A disc having a diameter of 10 mm. and made from Durieux chromatographic paper No. 123 bis is impregnated with a lactose solution at 30% and is thereafter dried.

A second disc made, from the same paper, but with a diameter of 8 mm. is impregnated with a solution of bromothymol at 1.5% and thereafter dried.

The discs—which correspond to discs 2 and 1 of FIGS. 1 and 2—are superposed in co-axial relation and one side of the assembly is covered with a layer of a polyvinyl chloride varnish and a drop of a culture of the bacteria to be examined is laid on the edge of the uncovered side of the lower disc (disc 2). The assembly is placed on an agar-agar gel 5, as illustrated in FIG. 2, wherein the gel rests on glass plate 4 and it is incubated at 37° C. After two hours the metabolic use of lactose by the yeasts is detected by the appearance of a yellow colour on the free side of the larger disc 2, through the transparent agar-agar support, this resulting from the relatively rapid diffusion of the indicating reagent from the smaller disc into the larger one.

*Example 2*

This example relates to the study of the use of various organic substances as carbon sources by bacteria of the Eacillus type in a synthetic culture medium.

The larger disc 2, made from Durieux paper 123 bis, is impregnated with a solution of bromothymol blue at 1.5% and dried.

The smaller disc 1 is made from Ecteola cellulose ET 20 Whatman paper which forms an ion exchanger capable of retaining anions. This disc is impregnated with a nutritive medium in which the sole source of carbon is for instance sodium citrate. It is thereafter dried.

The discs 2 and 1 are assembled by a polyvinyl chloride layer 3 and the bacteria are placed on the exposed side of disc 2. The assembly is placed on an agar-gar bed and is maintained at 37° C.

If the bacteria make use of sodium citrate the nutritive medium has a tendency to become alkaline. On the other hand the use of nitrogen, the source of which is generally the ammonium ions, tends to acidify this medium. But the paper of the smaller disc acts as an anion exchanger to retain the anions liberated by the use of nitrogen and therefore only the cations liberated form the citric ions diffuse from the smaller disc into the larger one where they cause the indicating reagent to take a dark blue colour.

*Example 3*

This example refers to the use of lactose by strictly anaerobic bacteria.

The procedure is substantially the same as in Example 1 with the difference that the solution used for impregnating the larger disc 2 contains a reducing agent, as follows:

|  | G. |
|---|---|
| Sodium hydrosulphite | 5.0 |
| Water | 1000 |

The yellow colour may appear when the discs have been maintained at 37° C. for seven to eight hours.

In the modification shown in FIGS. 3 and 4, the discs, designated by references 11 and 12, are assembled against each other in juxtaposition, along a secant $a$, the unit thus obtained being covered with a layer 13 of an impervious material.

It may be understood that in one or the other of the devices shown in FIGS. 1 and 3, the layer 23 (FIG. 5) or 53 (FIG. 6) of impervious material may be limited to the free side of the disc 1, respectively 11, which contains the indicating reagent.

In the embodiment shown in FIGS. 7 and 8, the discs 101 and 102 are assembled in juxtaposition along a secant $a$, as in the case of FIGS. 3 and 4. However, the smaller disc 101 is simultaneously impregnated with the chemical substance to be tested and with the coloured indicating reagent; for this purpose this disc 101 may be merely immersed, before being assembled with the disc 102, into a bath containing the chemical substance in a highly concentrated state, and the reagent, the said disc being thereafter dried. The layer of impervious material 103 is formed of paraffin, rubber or of a flexible strip or film made of cellulose acetate, polyvinyl chloride (P.V.C.) or the like, it being noted that this strip covers wholly the disc 101 and partly the disc 102.

It will be understood that in case the absorbent material of which the disc 102 is made is such that it retains by capillarity a sufficient amount of water, it is not necessary, in order to keep the device in the moist state, to place the same on the surface of an agar-agar gel or other hydrating medium. For this purpose the disc 102 may be made of a highly absorbent material, such as a paper covered, by sticking, with a pile of upstanding glass fibres perpendicular to the plane of the said paper, or of a fibrous texture, for instance an unwoven fabric of viscose-fibrane, impregnated with polysaccharides or derivatives of polysaccharides such as carboxy-methyl cellulose, hemi-cellulose, pectines gums or like substances.

In such a case, when it is desired to use the device, the latter is placed on any support having a transparent bottom, as for instance on the bottom 104 of a Petri-box. The device is seeded by inoculating disc 102, that is, by depositing on the portion of the disc 102 which is not covered by the strip 103 a sufficient number of droplets of a cellular suspension for entirely soaking the unit 101–102 by capillarity. After an incubation time at an appropriate temperature, the action of the living cells onto the chemical substance which is contained in the disc 101 may be studied by observing the coloration of the disc 102. As a matter of fact it may be understood that the indicating reagent diffuses from the disc 101 towards the disc 102, at the same time as the by-products resulting from the degradation of the chemical substance under consideration; this diffusion takes place through the secant $a$ and the colour change of the indicating reagent may be rapidly and easily observed on the fringe of diffusion.

As shown in FIG. 9, several devices according to FIGS. 7 and 8 may be placed on the bottom side of a single container wherein they are fixed by a single strip 103 of appropriate length. The discs 101 of these devices are impregnated with different chemical substances, in such a manner that several tests may be effected simultaneously.

In the modification illustrated in FIGS. 10 and 11, the device comprises a first ovally-shaped disc 111 of absorbent material. This disc 111 is placed on a second disc 112 having the same shape but of greater dimensions, strongly offset with respect of the said first disc 111. Prior to its drying the latter is impregnated with the chemical substance to be tested and with the appropriate indicating reagent. The whole is covered with a layer of impervious material, as for instance a cellulose acetate strip 113, which leaves uncovered a portion of the side of the lower disc 112.

The device thus obtained is then placed on the transparent bottom of a container. The protruding ends of the strip 113 ensure the securing of the device onto the bottom of the container.

It will be understood that the use of such a device is the same as in the case described with reference to FIGS. 7 and 8. The cellular suspension to be studied is placed on the uncovered portion of the lower disc 112, in an amount sufficient for moistening the whole of the device. The colour changes or other reactions rapidly appear on the disc 112 at the diffusion fringe of the indicating reagent, and may be easily observed through the transparent bottom of the container.

As illustrated in FIG. 12 the strip 113 may of course be of such a length as to ensure the securing of several devices onto the bottom 114 of the same container, as in the case of FIG. 9.

In the modification shown in FIG. 13, the device is directly obtained by cutting a single piece 120 from a sheet of absorbent material. The piece 120 comprises a portion 121 and a portion 122, both of substantially circular shape but of different diameters. Before cutting this piece 120, a strip 123 of cellulose acetate or the like has been applied onto the sheet of absorbent material, the said strip being so dimensioned as to leave uncovered a small surface 121a on the portion 121 and a larger surface 122a on the portion 122.

The portion 121 is then impregnated with a mixture containing the chemical substance to be tested and the indicating reagent; this impregnation may be effected either by depositing droplets of the mixture on the uncovered surface 121a, or by bringing the latter into contact with the said mixture. When using the device, the cellular suspension is deposited on the uncovered surface 122a in an amount sufficient for entirely moistening the whole of the device which may then be placed on the bottom of any appropriate container.

It will be appreciated that the piece may be of any desired shape. The piece 130 shown in FIG. 14 comprises a portion 131 of substantially circular shape, followed by a portion 132 of elongated rectangular shape; the layer 133 of impervious material leaves uncovered a lunule 131a for the impregnation, and a surface 132a for depositing the cellular suspension. In the modification shown in FIG. 15, the piece 140 is so cut as to comprise two portions 141 and 142, both of rectangular shape; here again the layer 143 of impervious material leaves uncovered two zones 141a and 142a respectively for the impregnating step and for depositing the cellular suspension. It is obvious that in the embodiments shown in FIGS. 14 and 15, the portion 132, respectively 142, may comprise an extension of any conformation, which may be more particularly so shaped as to facilitate the handling of the device.

From the foregoing description it may be understood that the use of a suspension of resting living cells in a non-nutritive medium permits of handling without particular precautions concerning sterility; further the device according to the invention may be produced in a simple and inexpensive manner. Moreover its use allows the rapid attainment of clear and distinct results.

What we claim:

1. A device for the study of the enzymatic composition of living cells by the detection of a metabolite produced by the action of said cells on a chemical substrate, comprising an absorbent support formed of first and second substantially sheet-form members of absorbent material in fixed relation and arranged to permit liquid interchange by absorption between said members, only one of said members containing said substrate the substrate being impregnated therein and in the dry state, and a transparent air- and water-tight layer affixed in place and covering at least the major part of one surface of one of said members, one of said members having an exposed area for receiving a suspension of said cells.

2. A device as claimed in claim 1, wherein said first and second members are disposed in juxtaposition with a part of said first member in contact with a part of said second member.

3. A device as claimed in claim 1, wherein said first and second members are disposed in superposition with a surface of said first member in contact with a surface of said second member.

4. A device for detecting the metabolic action of living cells on a chemical substrate which yields a detectable metabolite due to the metabolic action on said substrate of said living cells, comprising an absorbent support having first and second substantially sheet-form members of absorbent material in fixed relation and arranged to permit liquid interchange by absorption between said members, said first member containing said substrate the substrate being impregnated therein and in the dry state and said second member being free of said substrate, and an air- and water-tight transparent layer affixed in place and disposed on both said members so as to cover in part a surface of one member and at least a part of a surface of said other member, said second member forming a hydratable support for diffusion and one of said members having an exposed area for receiving a suspension of said cells.

5. A device as claimed in claim 4, wherein the first member also contains in the dry state a non-toxic indicating reagent adapted to detect the metabolite produced by the action of said species of living cells on said substrate.

6. A device as claimed in claim 4, wherein the second member is capable of retaining a sufficient quantity of liquid for dissolving the substrate contained in the first member.

7. A device for detecting the metabolic action of living cells on a chemical substrate by the detection of a metabolite produced by the action of said cells on said substrate, comprising an absorbent support formed of first and second substantially sheet-form members of absorbent material in fixed relation and arranged to permit liquid interchange by absorption between said members, the first of said members containing in the dry state an indicating reagent adapted to detect the metabolite produced by the action of said cells on said substrate, said second member containing said substrate the substrate being impregnated therein and in the dry state and said first member being free of said substrate, a transparent air- and water-tight layer affixed in place and covering at least the major portion of one surface of at least one of said members, one of said members having an exposed area for receiving a suspension of said cells.

8. A device as claimed in claim 7, wherein said first and second members are in the form of discs assembled in superposition.

9. A device as claimed in claim 7, wherein said first and second members are in the form of discs assembled in juxtaposition.

10. A device as claimed in claim 7, wherein the air- and water-tight layer covers substantially entirely one surface of one member and partly the corresponding surface of the other member.

11. A device as claimed in claim 7, wherein said absorbent unit is cut as a single piece from the same sheet of absorbent material and said members constitute different parts of said sheet.

12. A multiple assembly for the study of the enzymatic composition of living cells by the detection of a metabolite thereof produced by the action of said cells on a chemical substrate, comprising a support and a plurality of devices of claim 7 mounted on said support, said transparent layer being common to all the devices of said assembly.

13. A device for detecting the metabolic action of living cells on a chemical substrate by the detection of a metabolite produced by the action of said cells on said substrate, comprising an absorbent support formed of first and second substantially sheet-form members of absorbent material in fixed relation and arranged to permit liquid interchange by absorption between said members, only one of said members containing an indicating reagent in the dry state and only the other one of said members containing said substrate the substrate being impregnated therein and in the dry state, a transparent air- and water-tight layer affixed in place and covering at least a major portion of one surface of at least one of said members, one of said members having an exposed area for receiving a suspension of said cells.

14. A multiple assembly for detecting the metabolic action of living cells on a chemical substrate by the detection of a metabolite produced by the action of said cells on said substrate, comprising a base an a plurality of devices mounted thereon, each device comprising an absorbent support formed of first and second substantially sheet-form members of absorbent material in fixed relation and arranged to permit liquid interchange by absorption between said members, only one of said members containing an indicating reagent, said reagent being in the dry state, at least one of said members containing said chemical substrate, the substrate being impregnated therein and in the dry state, a transparent air- and water-tight layer affixed in place and covering at least the major portion of one surface of at least one of said members, one of said members having an exposed area for receiving a suspension of said cells, said transparent layer being common to all the devices of said assembly, wherein in each of said devices said members are disposed in juxtaposition with said first member contacting said second member.

15. A process for the study of the enzymatic composition of living cells which consists in (1) impregnating a part but not all of a highly absorbent substantially sheet-form support with a solution of a chemical substrate which is to be metabolized by said cells; (2) drying said support; (3) covering at least a part of one major surface of said support with an air- and water-tight transparent layer; thereafter (4) depositing an aqueous suspension of said living cells on an exposed part of said dried support; the amount of said suspension being sufficient to moisten both impregnated and non-impregnated areas of said support; (5) disposing said thus-inoculated support on an air-tight base with the other major surface thereof in contact with said base; (6) maintaining said support at an incubating temperature; and (7) detecting by an indicating reagent the presence of a metabolic substance produced by the action of said cells on said substrate.

16. A process as claimed in claim 15, wherein said support is in the form of first and second members disposed in juxtaposition with a part of said first member in contact with a part of said second member, and wherein only one member is impregnated with said substrate.

17. A process as claimed in claim 15, wherein said support is in the form of a first member and a second member having a smaller dimension disposed in superposition with a surface of said second member in contact with a surface of said first member and partly covering the same, and wherein only one member is impregnated with said substrate.

References Cited

UNITED STATES PATENTS

| | | | |
|---|---|---|---|
| 2,784,146 | 3/1957 | Goldman | 195—103.5 X |
| 2,785,057 | 3/1957 | Schwab et al. | 23—253 |
| 2,904,474 | 9/1959 | Forg | 195—103.5 X |
| 3,068,154 | 12/1962 | Majors | 195—103.5 X |
| 3,107,204 | 10/1963 | Brown et al. | 195—103.5 |
| 3,197,384 | 7/1965 | Goldman | 195—103.5 |

ALVIN E. TANENHOLTZ, *Primary Examiner.*

A. LOUIS MONACELL, *Examiner.*

UNITED STATES PATENT OFFICE
CERTIFICATE OF CORRECTION

Patent No. 3,367,841                                February 6, 1968

Jean Buissiere et al.

It is hereby certified that error appears in the above numbered patent requiring correction and that the said Letters Patent should read as corrected below.

Column 3, line 43, for "Eacillus" read -- Bacillus --; line 74, for "5.0 G." read -- 0.5G. --; column 4, line 10, for "53" read -- 33 --.

Signed and sealed this 15th day of April 1969.

(SEAL)
Attest:

Edward M. Fletcher, Jr.                            EDWARD J. BRENNER

Attesting Officer                                      Commissioner of Patents